United States Patent [19]

Mieszelewicz et al.

[11] Patent Number: 5,274,897

[45] Date of Patent: Jan. 4, 1994

[54] METHOD OF CORROSION PROTECTION AT PIPE JUNCTIONS

[76] Inventors: Gienek Mieszelewicz, 90 Elwyn ST., Bentleigh East; Brian A. Aylen, 4/7 Surrey Hills, Surrey Hills, both of Australia, VIC 3165

[21] Appl. No.: 721,651

[22] PCT Filed: Feb. 9, 1990

[86] PCT No.: PCT/AU90/00055

§ 371 Date: Sep. 17, 1991

§ 102(e) Date: Sep. 17, 1991

[87] PCT Pub. No.: WO90/09542

PCT Pub. Date: Aug. 23, 1990

[30] Foreign Application Priority Data

Feb. 9, 1989 [AU] Australia ............... PJ2670

[51] Int. Cl.5 .................................... B23P 11/00
[52] U.S. Cl. ........................... 29/458; 29/527.2
[58] Field of Search ............. 285/55; 29/458, 447, 29/525, 527.2, 527.4

[56] References Cited

U.S. PATENT DOCUMENTS

| 2,001,204 | 5/1935 | Long et al. | 29/447 |
|---|---|---|---|
| 3,020,068 | 2/1962 | Costanzo | 29/458 |
| 3,208,136 | 9/1965 | Joslin | 29/458 |
| 3,534,986 | 10/1970 | Hartmann et al. | 285/55 |
| 3,675,950 | 7/1972 | Beene | 285/45 |
| 4,035,003 | 7/1977 | James | 285/55 |
| 4,064,619 | 12/1977 | Echols et al. | 285/55 |
| 4,077,098 | 3/1978 | Ayusawa et al. | 29/33 T |
| 4,182,782 | 1/1980 | Scheiber | 427/195 |

FOREIGN PATENT DOCUMENTS

| 0254055 | 2/1988 | Austria | 285/55 |
|---|---|---|---|
| 1131010 | 9/1982 | Canada . | |
| 2258023 | 5/1974 | Fed. Rep. of Germany | 285/55 |
| 144801 | 6/1967 | New Zealand . | |
| 152402 | 6/1970 | New Zealand . | |
| 153101 | 12/1971 | New Zealand . | |
| 1542333 | 3/1979 | United Kingdom . | |
| 2145639 | 4/1985 | United Kingdom . | |

Primary Examiner—Mark Rosenbaum
Assistant Examiner—Kenneth J. Hansen
Attorney, Agent, or Firm—Fisher, Christen & Sabol

[57] ABSTRACT

A method for providing protection against corrosion of a pipe joint (1) formed by the mating of complementary ends (4, 5) of two pipes comprising the steps of:

(a) applying controlled heating to a pipe body which is to be joined to an adjacent pipe,
(b) applying to the ends (4, 5) of each pipe a protective layer or coating of material 2 to the pipe body by a time/temperature function process,
(c) allowing the pipe to cool,
(d) bevelling the terminations of the protective layer or coating (2),
(e) mating complimentary ends (4, 5) of the pipes together to form a sealed and corrosion resistant joint (1).

20 Claims, 1 Drawing Sheet

METHOD OF CORROSION PROTECTION AT PIPE JUNCTIONS

The present invention relates to a method of producing rubber-ring steel jointed pipe junctions having high internal and external long term corrosion protection, tight pipe end tolerances and being capable of withstanding high operating pressures. Whilst the invention is according to one embodiment directed towards and primarily described for producing steel pipe to be used in underground pipelines, it is anticipated that the invention is suitable for other forms of pipelines such as overground installations.

Earlier corrosion protection methods for the outer surface of underground pipelines have utilized bituminous enamels, whilst more recently the application of high quality plastic coatings such as polyethylene (PE) have been used. Both these methods of corrosion protection have been used in conjunction with cathodic protection systems. Typical prior art corrosion protection methods also utilize epoxy or cement linings for the internal surface of the steel pipe.

Corrosion protection utilizing coatings such as bituminous coatings have the major disadvantage that they create an effect known as the area effect, resulting in accelerated local corrosion if the coating is damaged. This often occurs as a result of abrasion or impact during laying of pipes.

Generally, a weak point in a pipeline occurs at the junction of pipes due to the fact that it is a site where the necessary elements to create electrolytic corrosion are present. It is critical that pipe joints be provided with effective resistance against corrosion however, in the past this has proved to be difficult.

At pipe joints it is necessary to provide &means for the purpose of preventing ingress of moisture which may precipitate corrosive processes. Furthermore, it is necessary to provide means to prevent the setting up of any electrolytic corrosion process. Pipe joints typically comprise the mating of a socket end (female part) and a spigot end (male part).

The socket end preferably has an internal groove into which a rubber ring fits to effect sealing of the joint.

Typically, the rubber-ring socket end of the pipe has previously been uncoated causing further major problems associated with use of the above-mentioned corrosion protection methods. The failure of such pipes resulting from corrosion of the pipe ends arises from the ingress of moisture and corrosive agents at the pipe joint.

In order to overcome the problems associated with the corrosion of pipe ends, the use of plastic coatings on the outer surface of the pipe has been extended to cover the internal surface of the rubber ring socket end of the pipe. Even though such practice has marginally improved the corrosion protection for such pipes the known methods of producing rubber ring socket ended steel pipe have not been adequate for producing economical and easy to assemble pipe having the outer plastic coating extending to the internal surface of the pipe joint. The major drawbacks stem from the critical tolerances required for the efficient mating of the pipe joint such that high operating pressures may be withstood and the increased difficulty associated with laying pipelines having the plastic coating extending to the internal surface of the pipe joint.

The present invention seeks to ameliorate the problems associated with rubber ring socket end joint pipes which have previously utilized an outer plastic coating which extends from the outer surface around the socket end to the inner surface of the socket end. The present invention therefore seeks to provide a method for forming a coated pipe junction of two pipes having a spigot end married to a socket end, each of said pipe ends having its outer surface covered with a protective layer, which extends around the socket end providing protection to the inner surface of the socket end. In one broad form according to the method aspect, the invention comprises the steps of:

(a) hot rolling a pipe socket end at controlled pipe temperature;
(b) quenching the pipe socket end;
(c) partially re-rolling the pipe socket end if it is undersized or requenching socket end if it is oversized;
(d) grit blasting of the pipe outer surface and the inner surface near pipe ends;
(e) controlled heating of the pipe;
(f) applying protective layer material to the pipe body by a time/temperature function process;
(g) elimination of any protective layer porosity by post heating;
(h) allowing the pipe to cool,
(i) bevelling the terminations of the protective coating layer.

In another form the present invention provides a method for forming a coated pipe end, said pipe having a spigot end and a socket end, with its outer surface covered with a protective layer, extending from an outer surface around the socket end providing protection to the inner surface of the socket end. The method generally comprises the steps of:

(a) producing a pipe with the spigot end shell having a diameter of a predetermined tolerance;
(b) hot rolling the pipe socket end at first preferred temperature whilst pipe is held by at least a first clamp at a first preferred distance from said socket with the area of the pipe at or near said clamp being held at a second preferred temperature;
(c) quenching the socket end when said socket end has cooled to a third preferred temperature;
(d)
  (i) partially reheating the pipe socket end, if end undersized, to a fourth preferred temperature and re rolling,
  (ii) partially reheating the socket end if end oversized thence clamping and heating to a fifth preferred temperature level followed by quenching;
(e) grit blasting simultaneously the pipe outer surface and inner surface near the pipe ends in a blast machine;
(f) heating the pipe body to a sixth preferred temperature level with the pipe body at or near said pipe ends held at a seventh preferred temperature level;
(g) immersing the pipe into the protective layer material and rotating, with the immersion process being controlled by a time/temperature function;
(h) elimination of the protective layer porosity by infrared radiation post heating, with the socket inner surface protective layer alternatively heated by induction for pipes having small thicknesses;
(i) cooling the pipe by natural or fan assisted drafting;
(j) bevelling the coating terminations of the protective layer.

In its broadest form the present invention comprises a method for the production of a corrosion resistant sealed pipe joint comprising essentially the steps of:
(a) hot rolling a pipe socket end at a controlled temperature followed by quenching;
(b) grit blasting the inner and outer surface of the pipe particularly at the end of the pipe;
(c) heating the pipe;
(d) applying a protective layer to the inner and outer surface of the pipe ends;
(e) allowing the pipe to cool;

In the preferred embodiment the pipe coating covers the outer surface and inner surface at the pipe ends so that the coating on the inner surface is at least partially sandwiched between the internal pipe surface and a concrete lining. A rubber ring is then inserted in a groove after application of a lubricant in the pipe end to provide a seal between it and a mating pipe.

The process is intended to be completed in the factory so no further field attention to the joint is required.

The invention will now be described by way of example with reference to the accompanying drawings in which.

Figure 1:
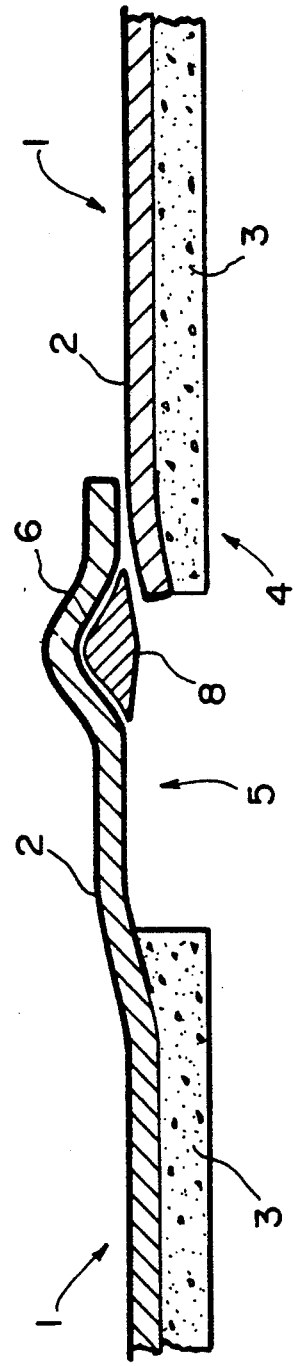
FIG. 1 illustrates one embodiment of the cross section of the socket ended pipe joint prior to assembly.
Figure 2:
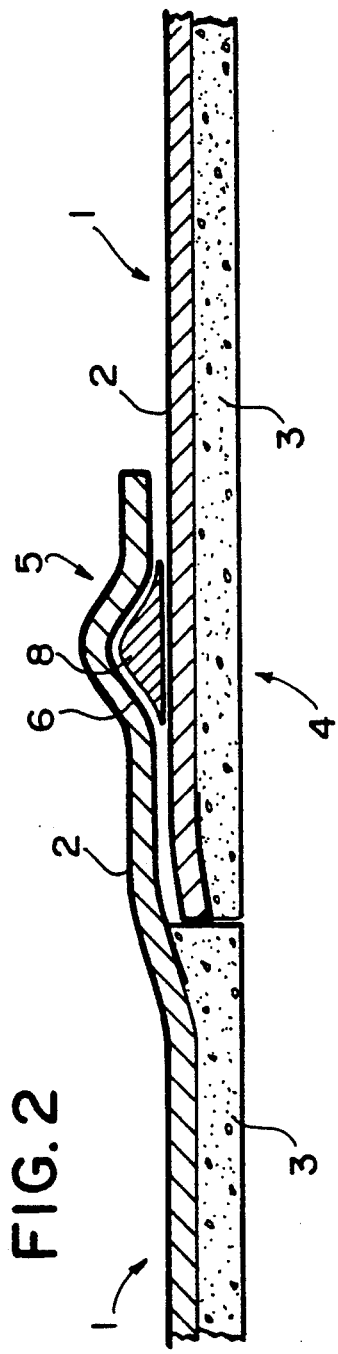
FIG. 2 illustrates the same embodiment of FIG. 1 fully assembled.

The present invention relates to an improved method for producing rubber-ring steel jointed pipe as shown according to one embodiment in FIGS. 1 and 2.

Referring to FIGS. 1 and 2, two views of a cross section of the pipe joint are shown, the first view showing the joint prior to assembly and the Becond following assembly. The pipes ends have the coating disposed on their external and internal surfaces as shown.

The pipes are coated externally by a polyethylene coating 2 and internally lined by a cement mortar lining 3, with the polyethylene coating 2 and cement mortar lining 3 being provided as corrosion resistant barriers for the steel pipes 1. The spigot end 4 of one pipe may be joined to the socket end 5 of another pipe 1. The socket end 5 is provided with an internal recess located at position 6 to accommodate a rubber ring 8. The rubber-ring 8 is lubricated prior to assembly to assist in assembly of the joint and provides a compressive watertight seal.

The polyethylene coating 2 extends around the socket 5 end and continues internally. The socket 5 end has its inner surface coated with the polyethylene coating 2 along its length and meets the cement mortar lining 3 which protects the remaining internal length of the pipe 1.

The methodology of the present invention seeks to improve the production of rubber-ring steel jointed pipes as mentioned above. Joint formation is effected in the following manner.

The pipe is produced initially with the spigot end of the shell to nominal diameters and mechanically sized to mate the socket within ±0.5 mm and limiting the growth at a point, 120 mm from the end of the shell. A collapse of 1 plate thickness is introduced at the very end of the spigot to permit ease of entry into the socket during assembly.

Larger growth values will cause assembly difficulties in the field that could render the joint impossible to assemble. Diameters below nominal will reduce rubber pre-compressing which provide the initial seal, controls organic root penetration through the joint, provides rounding forces on the socket to reduce localized lip gaps to below the critical level of 2 mm, and therefore eliminates the chance of rubber ring blow-out.

The diametric dimensions of the socket for each specific pipe size are designed taking into account the final nominal outside diameter of the spigot and the thickness and tolerance of the corrosion protection coating. The socket is hot rolled and this demands precise rolling die dimensions and settings plus an accurately controlled pipe temperature of 780° C.±20° C. for reproducibility of socket formation.

Since the pipe is held in clamps approx. 250 mm from the end that will be rolled into a socket, it is imperative that the 780° C.±20° C. temperature be uniform and limited in length to 200 mm with a sudden temperature gradient over the next 50 mm so that the pipe temperature in the clamp area is held at 400° C. max. This will avoid unacceptable shell deformation during the rolling operation.

The rate of socket material upset must be controlled to 6 mm per rolling head revolution to ensure concentricity of rolled socket with the pipe body. The socket formation must be completed in 4±1 revolutions of the rotary head followed by a controlled unloading speed of the inner die to ensure socket roundness and dimensional accuracy.

After the completion of rolling the next step is to quench the pipe. While the pipe is still held concentric and round to 0.5 mm by two clamps (relieved by 1.25% (outer) and 1.00% (inner) to match the temperature gradient of the shell), the newly rolled socket is water quenched and shrunk to size. Quenching begins when the pipe temperature is approx. 450° C.±25° C.

Where sockets are rolled outside specification, they can be corrected as follows:

When undersized, the correction is carried out by partial re-rolling after reheating the socket to 75% of the standard rolling temperature. Great care is required when repositioning the already rolled socket into the die system. The hump must be centered evenly between the outer dies before commencing to re-roll.

Oversized product is corrected by reheating the socket to 500° C.±25° C., reclamping and shrinking to size by water quenching.

SURFACE PREPARATION

The next step in the process is to prepare the pipe surface in order to enable application of the corrosion protection layer. Sound adhesion between the corrosion protection layer and the substrate is obtained principally due to "Anchor pattern" effects. Optimum pattern conditions are achieved by the use of steel grit abrasive conforming to "running mixes" of the following graduation:

| mM Passing | % |
| --- | --- |
| 840 | 12.8% |
| 710 | 27.0% |
| 600 | 28.5% |
| 500 | 14.5% |
| 425 | 9.2% |
| 355 | 4.7% |
| 300 | 3.3% |

TAKEOUT SIZE 177

As 1627 Part 4 Class 2.5-3 with profile height of 50-75 um Rtm and 85-95 Rt.

The internal surfaces of the joint ends are prepared simultaneously with the external process by selective rotational/travel delays when the critical joint areas are located in the "Hot Spot" region of the blast machine. Both direct and reflective particle impingement maintains profile character in the socket region including the shadow faces.

HEATING

The next step is to heat the pipe to the correct temperature gradient prior to coating the pipe with the protective layer.

Direct propane flame impingement heating with additional and independent open flame end heaters are located at 6 o'clock providing energy at 150,000 KJ/m. Pipe rotation of 7-12 re/min is used during this heat cycle which varies from 4-15 min and is dependent on the pipe mass. Temperature gradients are controlled such that 1-2 m of the pipe ends are held at 40°±5° C. above the pipe body temperature but never exceeding 400° C., at the time of discharge from the oven.

To balance the pipe end cooling effects, the pipe socket end temperature must be held to 30°±5° C. above the pipe body temperature with a maximum of 345° C., when the pipe dipping operation commences.

The spigot end can be held at a temperature closer to the pipe body temperature as there is less internal coating applied at that end.

For sound adhesion to be obtained, it is critical that the above temperature controls and the following lower limits on dip temperature are strictly observed:

| | |
|---|---|
| 280° C. and | 10 mm w.t. |
| 300° C. | 6 mm w.t. |
| 320° C. | 5 mm w.t. |
| 340° C. | 4.5 mm w.t. |

COATING

The coating process step which is a time/temperature function follows.

The pipe is rotated at 5-10 re/min., while immersed to 30% of its diameter in a fluidized polyethylene bath, held at 25°-60° C. Higher temperatures increase the rate of fusion onto the pipe. Immersion times vary between 2.5-5 min. which provides the necessary time to deposit coating thicknesses.

POST HEATING

The porosity in the coating is eliminated in a further step by post heating using infrared radiation techniques varying in time from 5-20 min. with the pipe shell temperature being held between 180°-220° C. Radiation levels are held at a point where shell temperature will not decay more than 1° C./min. and may even rise at a nominal rate of 0.3° C./min.

The socket lining is treated in a similar manner internally except when shell thicknesses are 5 mm. In this case induction heating is resorted to, using the following conditions:

The induction heating unit operates at 25 kw with 10 kHZ frequency and is ON for a number of seconds for five pipe revolution and OFF for number of seconds for one pipe revolutions to hold shell temperatures at 230° C.±20° C. Parameters are:

10 mm W.T. Post heat not required.
10 mm W.T. Marginal post heat required.
10 mm W.T. Post heat at 180°-210° C.

Heating limit is below the onset of surface oxidation and crazing. Temperature measurements of coating surface at e=0.96.

COOLING

Cooling of the pipe is the next step and is carried out by natural or fan assisted drafting which lowers the temperature from 200° C.±20° C. to 60° C. within a time limit of not less than 60 minutes.

BUFFING

Buff bevelling of the coating terminations at 1:5 tapers follows the cooling step.

RUBBER RINGS

Rubber rings of a suitable type are utilized for the sealing means of the pipe joint.

The present invention therefore provides a method for producing corrosion barrier coated pipes.

It should be obvious to persons skilled in the art that numerous variations and modifications could be made to the method and apparatus of the present inventions as described and with reference to the drawings without departing from the overall scope or spirit of the invention.

We claim:

1. A method for providing an extended length of corrosion resistant steel pipe, said length of pipe being formed by the mating of a socket end first pipe, with a complementary spigot end of a second pipe and first pipe and said second pipe each having an inner and an outer surface, comprising the steps of:
    (a) applying controlled heating to said first pipe which is to be joined to said second pipe,
    (b) applying to the spigot end and socket end of each pipe and outer protective layer of a plastic, said protective layer having one of its ends terminating on the outer surface of the pipe and the other end terminating on the inner surface of the pipe such that the protective layer covers a portion of the outer surface of each pipe and passes continuously around to the internal surface of each pipe,
    (c) heating the plastic coated pipe to eliminate protective layer porosity,
    (d) allowing each pipe to cool,
    (e) bevelling the plastic protective layer of each pipe, and
    (f) inserting the spigot end of said first pipe into the socket end of said second pipe to form a sealed corrosion-resistant joint.

2. The method according to claim 1 comprising the additional preliminary steps before controlled heating of the first pipe of:
    (a) hot rolling the first pipe at a first temperature while the first pipe is held by at least one clamp,
    (b) quenching the socket end of he first pipe when the socket end has cooled to a second temperature.

3. The method according to claim 2 further comprising grit blasting the outer surface and the inner surface of each pipe near the pipe ends prior to controlled heating of the first and second pipes.

4. A method according to claim 3 further comprising reheating the pipe socket end after said quenching then rerolling the pipe to increase the size of the pipe socket.

5. The method according to claim 3 further comprising reheating the socket end after said quenching, then clamping and heating followed by quenching the pipe socket end to reduce its size.

6. The method according to claim 5 wherein said reheating of the socket end is to a temperature within the range of 475° C. to 525° C.

7. The method according to claim 2 wherein the hot rolling temperature is controlled within the range of 760° C. to 800° C. and at a distance not greater than 250 mm from the heated pipe end.

8. The method according to claim 7 wherein the pipe temperature in the clamp area is not greater than 400° C.

9. The method according to claim 8 wherein the quenching begins when said second temperature is within the range of 425° C. to 475° C.

10. The method according to claim 1 wherein said plastic protective layer is applied by immersing the pipe end in the protective layer material and rotating the pipe.

11. The method according to claim 10 wherein said eliminating of protective layer porosity is by infrared radiation or by induction heating.

12. The method according to claim 10 wherein said controlled heating of the first pipe comprises rotating the pipe in an open flame.

13. The method according to claim 1 wherein said heating to eliminate protective layer porosity comprises infrared radiation for a period of 5 to 20 minutes and at a temperature falling within the range of 180° C. to 220° C.

14. A method for producing protective coating for steel pipes applied at a spigot end and socket end of each pipe so that the coating covers a portion of the outer surface of each pipe and passes continuously around the pipe extremities and along the internal surface of each pipe for a predetermined distance thereby providing a corrosion resistant joint formed by mating of the spigot end of one pipe with the socket end of another pipe, the method comprising the steps of:

(a) hot rolling a pipe at a first temperature while the pipe is held by at least a first clamp at a distance from said socket end with the area of the pipe at or near said first clamp being held at a second temperature, (b) quenching the socket end when said socket end has cooled to a third temperature, (c) grit blasting simultaneously the pipe outer surface and inner surface near the pipe ends in a blast machine, (d) heating the pipe followed by quenching, (e) immersing the pipe into a protective coating material and rotating the pipe to coat it with a layer of protective coating material, (f) eliminating the protective layer porosity by infrared radiation heating or by induction heating, (g) cooling the pipe by natural or fan assisted drafting, and (g) bevelling the coating terminations of the protective layer.

15. The method according to claim 14 wherein the hot rolling temperature is controlled within the range of 760° C. to 800° C. at a distance not greater than 250 mm from the heated pipe end.

16. The method according to claim 15 wherein said second temperature is not greater than 400° C.

17. The method according to claim 16 wherein the quenching begins when said third temperature is within the range of 425° C. to 475° C.

18. The method according to claim 17 wherein after said quenching of the socket end it is reheated to a temperature within the range of 475° C. to 525° C.

19. The method according to claim 18 wherein the heating of the pipe before said immersion in said protective coating material comprises rotating the pipe in an open flame.

20. The method according to claim 19 wherein said infrared radiation heating takes place for a period of 5 to 20 minutes and at a temperature falling within the range of 180° C. to 220° C.

* * * * *